US010360019B2

(12) United States Patent
Mulé

(10) Patent No.: US 10,360,019 B2
(45) Date of Patent: Jul. 23, 2019

(54) AUTOMATED DISCOVERY AND NOTIFICATION MECHANISM FOR OBSOLETE DISPLAY SOFTWARE, AND/OR SUB-OPTIMAL DISPLAY SETTINGS

(71) Applicant: Apple Inc., Cupertino, CA (US)

(72) Inventor: Jean-François Mulé, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/713,384

(22) Filed: Sep. 22, 2017

(65) Prior Publication Data

US 2018/0088933 A1 Mar. 29, 2018

Related U.S. Application Data

(60) Provisional application No. 62/399,138, filed on Sep. 23, 2016.

(51) Int. Cl.

| | |
|---|---|
| ***G06F 9/445*** | (2018.01) |
| ***G06F 8/654*** | (2018.01) |
| ***G06F 8/61*** | (2018.01) |
| ***G06F 9/4401*** | (2018.01) |

(52) U.S. Cl.
CPC ................ *G06F 8/654* (2018.02); *G06F 8/61* (2013.01); *G06F 9/4411* (2013.01)

(58) Field of Classification Search
CPC ............. G06F 8/35; G06F 8/61; G06F 9/4411
USPC .......................................................... 717/173
See application file for complete search history.

(56) References Cited

U.S. PATENT DOCUMENTS

| | | | | |
|---|---|---|---|---|
| 7,450,084 | B2 | 11/2008 | Fuller | |
| 8,325,824 | B2 | 12/2012 | Kim | |
| 8,543,543 | B2 | 9/2013 | Marcelais | |
| 9,081,642 | B2 | 7/2015 | Bielski | |
| 2006/0132473 | A1* | 6/2006 | Fuller | G06F 3/1438 345/204 |
| 2007/0050762 | A1* | 3/2007 | Chen | G06F 8/71 717/169 |

(Continued)

OTHER PUBLICATIONS

Title: A new trust region method with self-adaptive update rules for unconstrained optimization, publication date:2012; author: Yunlong Lu et al, source: IEEE.*

*Primary Examiner* — Chameli Das
(74) *Attorney, Agent, or Firm* — Blank Rome LLP

(57) ABSTRACT

Techniques for managing a display device coupled to a media processing (MP) device are described. An MP logic/module implemented by the MP device can retrieve data from a display device and identify information characterizing the display device in a database based on the retrieved data. The MP logic/module can compare the retrieved data with the identified information and determine, based on the comparison, that software installed on the display device is obsolete, or that one or more settings of the display device has a first configuration. The MP logic/module can also generate a notification based on the determination, which can be displayed on the display device. The MP logic/module can trigger performance of an action based on the determination. Actions can include downloading an updated software to memory, installing the updated software, or changing the one or more settings from the first configuration to a second, more optimal configuration.

24 Claims, 7 Drawing Sheets

200

RETRIEVE DATA FROM A DISPLAY DEVICE — 201

IDENTIFY INFORMATION IN A DATABASE BASED ON THE RETRIEVED DATA — 203

COMPARE THE RETRIEVED DATA WITH THE IDENTIFIED INFORMATION — 213

DETERMINE OBSOLETE SOFTWARE AND/OR A SUB-OPTIMAL CONFIGURATION OF SETTINGS — 205

DETERMINE AN UPDATE AND/OR A MORE OPTIMAL CONFIGURATION — 211

GENERATE A NOTIFICATION — 207

PERFORM AN ACTION — 209

(56) References Cited

U.S. PATENT DOCUMENTS

| | | | | |
|---|---|---|---|---|
| 2007/0098355 | A1* | 5/2007 | Kim | G09G 5/003 386/230 |
| 2011/0126119 | A1* | 5/2011 | Young | G06F 3/048 715/744 |
| 2012/0089974 | A1* | 4/2012 | Cho | G06F 8/61 717/173 |
| 2012/0266153 | A1* | 10/2012 | Bielski | G06F 8/65 717/168 |
| 2013/0066901 | A1* | 3/2013 | Marcelais | G06F 17/30097 707/769 |
| 2013/0104121 | A1* | 4/2013 | Iwaya | G06F 8/61 717/174 |
| 2013/0212440 | A1* | 8/2013 | Rom | G06F 11/0709 714/47.1 |

* cited by examiner

AUTOMATED DISCOVERY AND NOTIFICATION MECHANISM FOR OBSOLETE DISPLAY SOFTWARE, AND/OR SUB-OPTIMAL DISPLAY SETTINGS

CROSS-REFERENCE TO RELATED APPLICATIONS

This application claims priority to U.S. Provisional Application No. 62/399,138, entitled "AUTOMATED DISCOVERY AND NOTIFICATION MECHANISM FOR OBSOLETE DISPLAY SOFTWARE, AND/OR SUB-OPTIMAL DISPLAY SETTINGS," filed Sep. 23, 2016. U.S. Provisional Application No. 62/399,138 is hereby incorporated by reference in its entirety.

FIELD

Embodiments described herein relate to media processing (MP) devices. More particularly, the embodiments described herein relate to techniques for managing a display device coupled to an MP device.

BACKGROUND INFORMATION

Display devices (e.g., computer displays, television displays, etc.) are often not in optimal operating conditions because: (i) the software of the display device is outdated; or (ii) the settings applied to the display device are in a sub-optimal configuration. Software of the display device includes, but is not limited to, the following: firmware; application software (e.g., a web browser, etc.); and system software (e.g., operating systems, device drivers, GPU drivers, etc.). Some display devices may include media processing (MP) devices. Settings applied to the display device include, but are not limited to, the following: settings for the display resolution, which indicates a range of input formats that the display device will accept and often includes formats greater than a grid size of a screen of the display device even though they have to be down-scaled to match the screen's parameters (e.g. accepting a 7680×4320 input on a display with a native 3840×2160 pixel array); settings affecting the frequency rate of consecutive images or frame rate (e.g. frame rate of 120 Hz or 120 frames per second); settings affecting optical resolution; settings affecting colorimetry; settings affecting brightness; settings affecting backlighting; settings affecting contrast; settings affecting color space; settings affecting balance; settings affecting processing units of the display device (e.g., DSPs, CPUs, GPUs, etc.); settings affecting display modes of the display device (e.g., cinema High Dynamic Range); settings affecting display transport or protocol interfaces (e.g., DisplayPort® mode, HDMI mode, etc.).

Modern day displays that are communicatively coupled to one or more external computing systems (e.g., data stores, servers, etc.) via a network can be configured to automatically download updates from these external system(s). Nevertheless, many users do not update the software because the automatic download and installation process might be time-intensive. This time-intensive process can affect the functioning of devices coupled to the display device. For example, media provided to a display device may not be presented properly on the display device because the display device has not been updated to include software that enables proper presentation of the media.

Another related problem that affects some modern day displays stems from the variety of display resolutions and frame rates (also known as display timings) that these displays can use to present media. Display resolutions include, but are not limited to, the following: (i) ultra high-definition resolution, such as 4K resolution, which may be based on the DCI 4K resolution standard or the UHD-1 standard (also known as the ultra-high-definition television (UHDTV) standard); and (ii) common high-definition resolutions, such as FHD or Full HD resolution, which is standardized to a resolution of 1920 pixels×1080 pixels in a 16:9 aspect ratio). In some scenarios, settings applied to such a display device may have to be adjusted before media provided to the display device can be presented properly in particular resolution on the display device.

In some situations, these settings cannot be adjusted without manual intervention and selection of proper display modes. Consequently, users do not adjust their settings, and as a result, the media might not be presented by the display device in its intended or optimal image quality as intended by the image or content creators.

SUMMARY

Methods, apparatuses, and systems for techniques used to manage a display device coupled to a media processing (MP) device are described. For one embodiment, an MP logic/module implemented by the MP device can retrieve data from a display device. For one embodiment, the MP logic/module can identify information characterizing the display device in a database based on the retrieved data. For one embodiment, the MP logic/module compares the retrieved data with the identified information. The MP logic/module can determine, based on the comparison, that software installed on the display device is obsolete, or that one or more settings of the display device has a first configuration. For one embodiment, the MP logic/module generates a notification based on the determination. The notification may be displayed on the display device. For one embodiment, the MP logic/module triggers performance of an action based on the determination. Actions can include downloading an updated software to memory, installing the updated software, or changing the one or more settings from the first configuration to a second, more optimal configuration.

Other features or advantages of the embodiments described herein will be apparent from the accompanying drawings and from the detailed description that follows below.

BRIEF DESCRIPTION OF THE DRAWINGS

Embodiments described herein are illustrated by way of example and not limitation in the figures of the accompanying drawings, in which like references indicate similar features. Furthermore, in the figures some conventional details have been omitted so as not to obscure the inventive concepts described herein.

DETAILED DESCRIPTION

Methods, apparatuses, and systems for managing a display device coupled to a media processing (MP) device are described. Such embodiments can assist with at least one of the following: (i) discovering, configuring, and/or updating settings for a display device coupled to a MP device; or (ii) discovering, configuring, and/or updating software installed in a display device coupled to a MP device. The management techniques described herein differ from conventional software update techniques that require a computing device (e.g., a display device, etc.) to update its software by periodically checking for updates. The techniques described herein also differ from conventional techniques of changing configurations of settings applied to a computing device (e.g., display resolution settings applied to a display device, etc.). Instead, the techniques described herein enable a first computing device (e.g., a MP device/system, etc.) coupled to a second computing device (e.g., a display device, etc.) to: (i) monitor the second computing device's installed software and/or configuration of settings; and (ii) update the software and/or change the configuration of settings. In this way, the first computing device can update the software of the second computing device and/or modify the second computing device's settings. Alternatively or additionally, the first computing device can generate and provide a notification to the second computing device to cause the second computing device to perform update its own software and/or modify its own settings.

Embodiments of the techniques set forth herein can assist with improving the functionality of computing devices or systems (e.g., MP devices, etc.) that manage one or more display devices coupled to such devices/systems. Computer functionality can be improved by assisting devices/systems that implement the management techniques described herein with reducing or eliminating wasted computational resources (e.g., memory, processing power, computational time, etc.) required by display devices operating on outdated software and/or sub-optimal settings. For example, embodiments described herein may increase the likelihood that a display device will operate using appropriate software/settings based on management of the display device by an MP device. Such management can in turn increase the likelihood that the display device will function efficiently. Reducing or eliminating the additional resources may improve the functioning of a display device by increasing the processing power available for other tasks, extending the life of the display device, and/or improving user experiences.

Figure 1A:
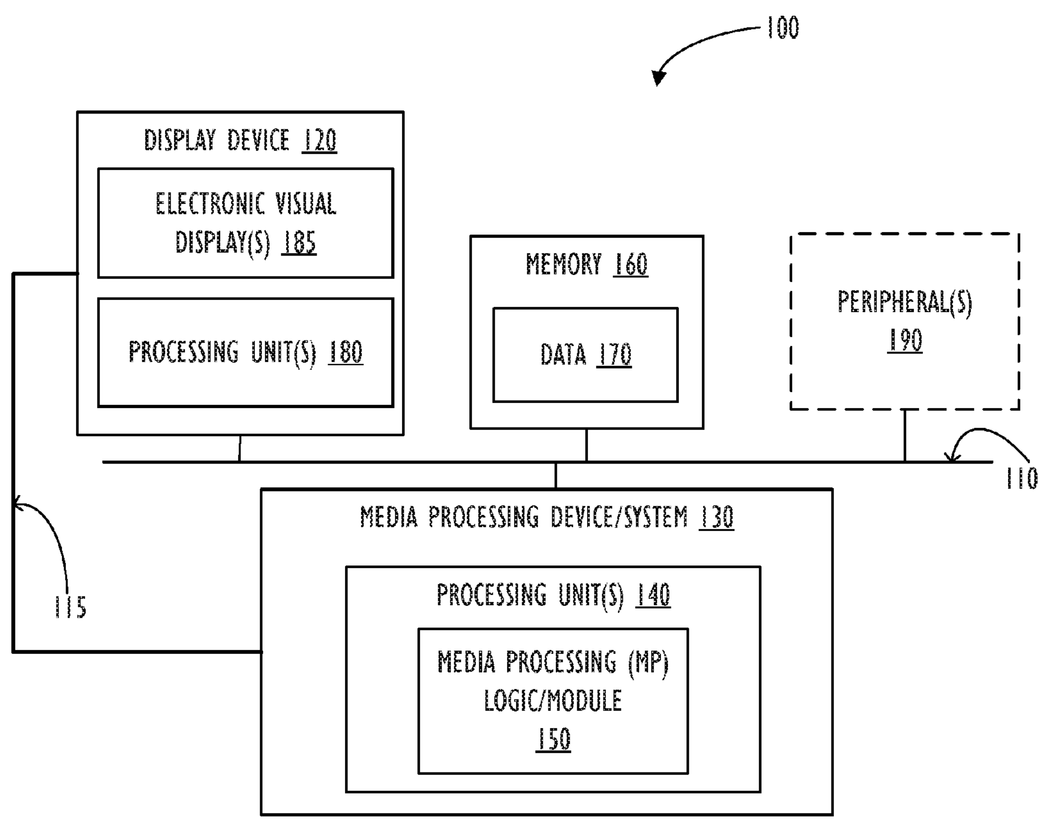
FIG. 1A illustrates, in block diagram form, a processing system that includes electronic components for managing a display device according to an embodiment.

FIG. 1A, illustrates in block diagram form, a processing system 100, which includes electronic components for performing a technique used to manage a display device 120 according to an embodiment. For one embodiment, at least one of the components of the system 100 can be spatially separated and implemented on separate computing systems that are connected by the communication fabric 110, which is described in further detail below. Alternatively, the system 100 can be housed as a single computing device, such as a desktop computer, a laptop computer, a tablet computer, a server, a mobile phone, a media player, a personal digital assistant (PDA), a personal communicator, a gaming device, a network router or hub, a wireless access point (AP) or repeater, a set-top box, a television, or a combination thereof.

The system 100 may include a MP device/system/process 130 that includes processing unit(s) 140 (e.g., one or more central processing units (CPUs), one or more graphics processing units (GPU), etc.). The system 100 can also include a communication fabric 110, memory 160, a display device 120 that includes processing unit(s) 180, and optional peripheral(s) 190. Each of these is described below.

Display device 120 may be a television, a computer monitor, a projector, or any other suitable equipment for displaying visual information. Display device 120 may include processing unit(s) 180 for displaying information via one or more electronic visual display(s) 185. Visual display(s) 185 can include, but is not limited to, a liquid crystal display (LCD), an organic light-emitting diode displays (OLED), a plasma display, a cathode ray tube (CRT) display, and/or any display that uses other display technologies.

For one embodiment, the display device 120 includes processing unit(s) 180, such as CPUs, GPUs, and other types of integrated circuits (ICs). Processing unit(s) 180 may also contain circuits such as memory, processors, application specific integrated circuits, and other storage and processing circuitry. Processing unit(s) 180 can also be configured to communicate with the MP device/system 130 (e.g., the processing unit(s) 140) via communications fabric 110. Additionally, processing unit(s) 180 may be configured as display driver circuitry, which can be used to display information via the display(s) 185. The displayed information can include data 170 from memory 160 and/or data processed by the processing unit(s) 180.

As shown in FIG. 1A, the system 100 can include a media processing (MP) device/system 130. The MP device/system 130 can be a stationary or portable electronic device (e.g., a videogame console, a desktop computer, an Internet-of-Things (IoT) device, a laptop computer, a tablet computer, a wearable computer, a cellular telephone, a vehicle, etc.). The MP device/system 130 can include functionalities of a communications device (e.g., a smartphone, a voice-over-IP device, etc.), a digital media player, a video game console, and/or a network appliance. For one embodiment, the device/system 130 can provide data 170 residing in memory 160 or data processed by the processing unit(s) 140 to the display device 120, which presents the data via display(s) 185.

For one embodiment, the MP device/system 130 includes processing unit(s) 140, such as CPUs, GPUs, digital signal processors (DSPs), and/or other types of integrated circuits (ICs). Processing unit(s) 140 may also contain circuits such as memory, processors, application specific integrated circuits, and other storage and processing circuitry. Processing unit(s) 140 can also be configured to communicate with the display device 120 (e.g., the processing unit(s) 180, the display(s) 185, etc.) via a coupling mechanism 115 of the communications fabric 110, as described below. Additionally, processing unit(s) 140 may be configured as display driver circuitry, which can be used to display information via the display(s) 185. The displayed information can include data 170 acquired from memory 160 via the display(s) 185 and/or data processed by the processing unit(s) 140 (e.g., the media processing (MP) logic/module 150, etc.).

For one embodiment, the processing unit(s) 140 enables the device/system 130 to manage the display device 120. For one embodiment, the processing unit(s) 140 include a media processing (MP) logic/module 150 used to achieve such management. The MP logic/module 150 can be implemented within the device/system 130 as at least one of hardware (e.g., electronic circuitry associated with the processing unit(s) 140, circuitry, dedicated logic, etc.), software (e.g., one or more instructions associated with a computer program executed by the processing unit(s) 140, software run on a general-purpose computer system or a dedicated machine, etc.), or a combination thereof. Additional details about the MP logic/module 150 are described below in connection with one or more of FIGS. 1A-5.

For one embodiment, processing unit(s) 180 may maintain information about one or more features of the display device 120. For one embodiment, the information characterizing the display device 120 can be maintained in any type of data structure or data format. For a further embodiment, the information can be maintained in (i) an extended display identification data (EDID) structure or (ii) a variable length data structure based on the display identification data (DisplayID) standard owned by Video Electronics Standards Association (VESA®). For brevity, variable length data structures based on the DisplayID standard are referred to herein as DisplayID structures. For one embodiment, the maintained information can be in form of a media processing (MP) data structure that is generated using at least one of an extended display identification data (EDID) structure, a DisplayID structure, or other information retrievable from the display device 120. For example, the MP data structure can include at least one of the following: some or all information in an EDID structure; some or all information available in a DisplayID structure; a current version of software installed on the display device 120; or current configuration of settings used by the display device 120.

For one embodiment, the MP logic/module 150 generates a unique identifier (e.g., a unique hash, etc.) based on the data in the structure(s) obtained from the display device 120. Techniques of generating unique identifiers include, but are not limited to, hash function algorithms and other techniques of generating identifiers for indexing and retrieving items in a database.

For one embodiment, the system 100 includes a communication fabric 110. For a specific embodiment, the fabric 110 includes a coupling mechanism 115 used for coupling the MP device/system 130 with the display device 120. The coupling mechanism 115 can, for one embodiment, enable information exchange between the display device 120 and device/system 130. For one embodiment, the coupling mechanism 115 can be a wired cable having opposing ends with connectors, which couple corresponding connectors in the display device 120 and device/system 130 with each other. For one embodiment, the coupling mechanism 115 is a display cable such as a high-definition multimedia interface (HDMI) cable, a DisplayPort® cable, a universal serial bus (USB) cable, a digital visual interface (DVI) cable, a video graphics array (VGA) cable, an optical cable, or other display cable. The coupling mechanism 115 can also be a wireless mechanism that communicatively couples the display device 120 and device/system 130 and enables exchange of information between the two components. For brevity, the coupling mechanism 115 is described as a wired cable (e.g., a display cable, etc.). For one embodiment, the mechanism 115 enables communication between the device 120 and the device/system 130 based on one or more protocols. These protocols can be based on a specification—for example, a DisplayPort specification, an HDMI specification, a USB-C Power Delivery specification, a USB specification, an Internet Protocol (IP) specification, etc.), etc.

The communication fabric 110 can be a bus, a network, a switch, or an operating system inter-process communication mechanism. When the fabric 110 is a bus, the fabric 110 is a communication system that transfers data between components of system 100, or between components of system 100 and other components of other systems (not shown). As a bus, the fabric 110 includes all related hardware components (wire, optical fiber, etc.) and/or software, including communication protocols. For one embodiment, the fabric 110 can include at least one of an internal bus or an external bus. Moreover, the fabric 110 can include at least one of a control bus, an address bus, or a data bus for communications associated with the system 100. For one embodiment, the fabric 110 can be a network or a switch. As a network, the fabric 110 may be any type of network such as a local area network (LAN), a wide area network (WAN) such as the Internet, a fiber network, a storage network, or a combination thereof, wired or wireless. When the fabric 110 is a network, the components of the system 100 do not have to be physically located next to each other. When the fabric 110 is a switch (e.g., a "cross-bar" switch), separate components of system 100 may be linked directly over a network even though these components may not be physically located next to each other. For example, two or more of the processing unit(s) 140, the processing unit(s) 180, the display(s) 185, the communication fabric 110, the memory 160, and the optional peripheral(s) 190 are in distinct physical locations from each other and are communicatively coupled via the communication fabric 110, which is a network or a switch that directly links these components over a network.

The system 100 can include memory 160 for storing and/or retrieving data 170, which can include digital media, data describing display device 120, optional data describing optional peripheral(s) 190, and/or metadata associated with the data. The data 170 can be processed and/or captured by the other components of the system 100. For example, data 170 can be captured by, processed by, or associated with device/system 130, display device 120, and/or optional peripheral(s) 190 can be stored to and/or retrieved from the memory 160. The system 100 can also include a memory controller (not shown), which includes at least one electronic circuit that manages data flowing to and/or from the memory 160. The memory controller can be a separate processing unit or integrated as part of processing unit(s) 140 and/or processing unit(s) 180. For one embodiment, software (e.g., programs, code, instructions, etc.) executed by the processing unit(s) 140 and/or the processing unit(s) 180 can be stored in the memory 160. Examples of such software include, but are not limited to, the MP logic/module 150.

The system 100 can also include optional peripheral(s) 190. For one embodiment, the optional peripheral(s) 190 can include at least one of the following: (i) one or more input devices that interact with or send data to one or more components of the system 100 (e.g., mouse, keyboards, image capture devices/systems, ambient light sensor, wireless Bluetooth peripheral, etc.); (ii) one or more output devices (other than display devices) that provide output from one or more components of the system 100 (e.g., monitors, printers, haptic feedback devices/systems, etc.); or (iii) one or more storage devices that store data in addition to the memory 160. The optional peripheral(s) 190 may combine different devices into a single hardware component that can be used both as an input and output device (e.g., a touchscreen, etc.). The optional peripheral(s) 190 can also be referred to as input/output (I/O) devices 190 throughout this document. The system 100 can also include at least one optional peripheral control circuit (not shown), which can be a controller (e.g., a chip, an expansion card, or a stand-alone device, etc.) that interfaces with and is used to direct operation(s) of the optional peripheral(s) 190. The optional peripheral(s) controller can be a separate processing unit or integrated as one of the processing unit(s) 140 or the processing unit(s) 180.

Figure 1B:
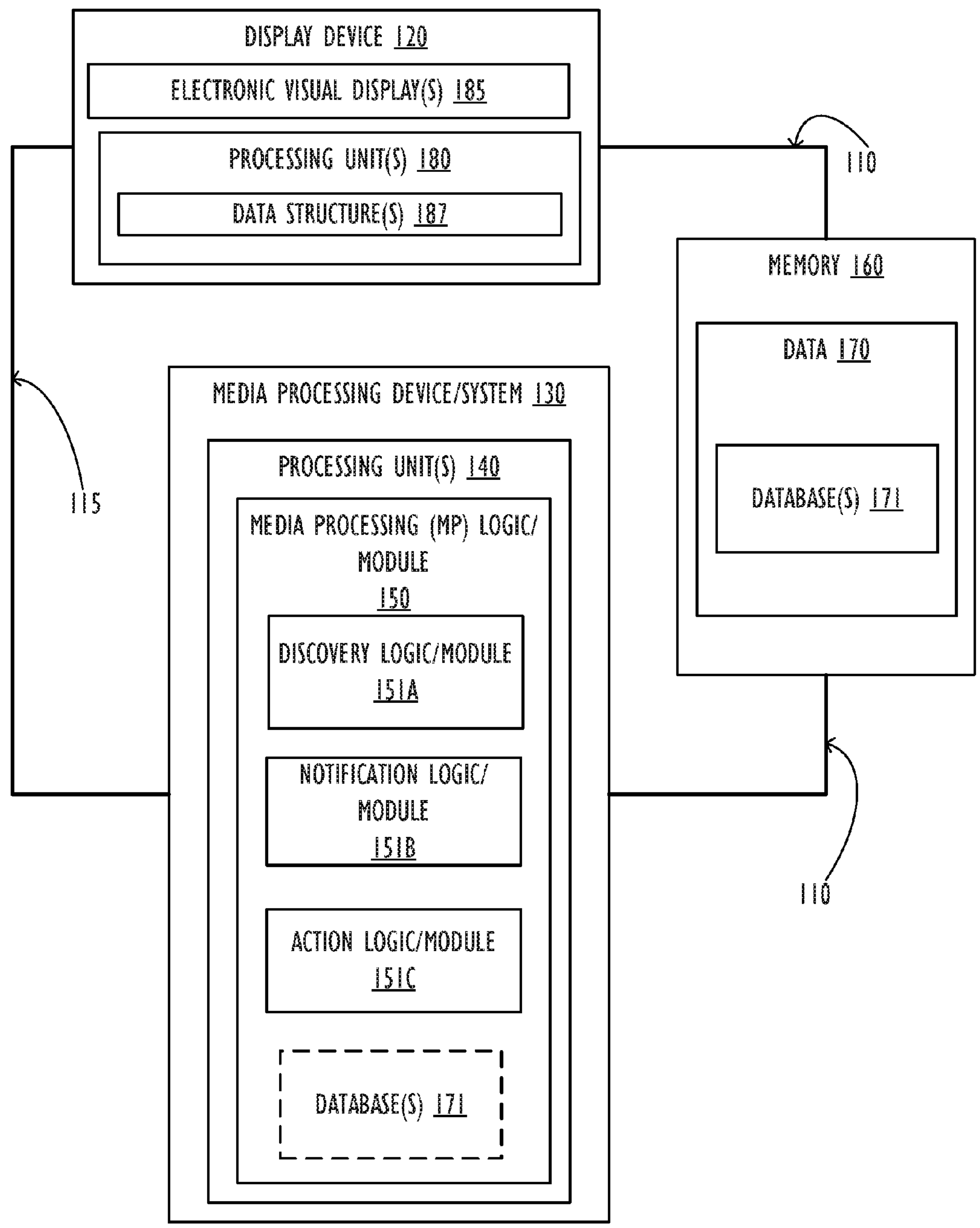
FIG. 1B illustrates, in block diagram form, a MP device/system managing a display device using memory according to one embodiment. The MP device/system, the display device, and the memory illustrated in FIG. 1B can be included in the processing system illustrated in FIG. 1A.

FIG. 1B illustrates, in block diagram form, additional details about the MP device/system 130 managing the display device 120 with the memory 160 according to one embodiment. The MP device/system 130, the display device 120, and the memory 160 illustrated in FIG. 1B can be included in the processing system 100 illustrated in FIG. 1A.

When a user wishes to view information on display device 120, the user may couple the display device 120 with the device/system 130 using coupling mechanism 115. For one embodiment, the MP logic/module 150 can obtain the maintained information from display 120 in response to being coupled to the display device 120. For example, the MP logic/module 150 may request that the display device 120 provide the MP logic/module 150 with information on the capabilities of display device 120, its processing unit states such as power, audio and video capabilities & system states. For one embodiment, the display device 120 provides its maintained information via one or more data structures 187 (e.g., the EDID structure, the DisplayID structure, the MP data structure, etc.) in response to request from the MP logic/module 150.

For one embodiment, a discovery logic/module 151A of the MP logic/module 150 requests the data structure 187 from the display device 120. In addition, the discovery logic/module 151A can process the data structure(s) 187 to determine information on the capabilities of display device 120. For one embodiment, the discovery logic/module 151A extracts information about video interfaces, display device technology, display resolution details and/or manufacturer information associated with display device 120 from the data structure 187. For example, discovery logic/module 151A may extract some or all of the following information from the data structure: a manufacturer of the display device 120; a serial number assigned to the display device 120; a type of the display device 120; display resolutions supported by the display device 120; a model number of the display device 120, a version of software installed on the display device 120, extended display identification data (EDID) associated with the display device 120, a port of the display device 120 coupled to the MP device/system 130; a size of the display device 120; luminance data associated with the display device 120; and/or pixel mapping data or pixel formats associated with the display device 120.

Referring again to FIG. 1B, the discovery logic/module 151A can generate a unique identifier based on the data extracted from the structure(s) 187. For example, the discovery logic/module 151A generates the unique identifier as a unique hash based on the data extracted from the structure(s) 187. Techniques of generating unique identifiers include, but are not limited to, hash function algorithms and other techniques of generating identifiers for indexing and retrieving items in a database.

For one embodiment, the discovery logic/module 151A can compare the unique identifier with information in a database 171 associated with the display device 120. The database 171 can be part of data 170 residing the memory 160. Optionally, the database 171 may reside in the MP logic/module 150 as shown by dashed box in FIG. 1B. For one embodiment, the information in the database 171 characterizes the display device 120. Thus, the database 171 includes information about features of the display device 120 for verifying the data extracted from the structure(s) 187. Such information in the database 171 can include the same information extracted from the data structure 187, as well as additional information. This additional information can include, but is not limited to, information about one or more versions of the software on the display device 120, information about a capability of the version(s) of the software on the display device 120, and information about one or more ports of the device/system 130.

For one embodiment, the information in the database 171 includes a verification data structure that can include at least one of the following: some or all information in an EDID structure; some or all information available in a DisplayID structure; a firmware object; a device capability object; a device port object; a color management object; or a display configuration identifier. For one embodiment, the information contained by at least one of an EDID structure; a DisplayID structure; a firmware object; a device capability object; a device port object; a color management object; or a display configuration identifier can discovered from publicly available documents associated with the display device 120 (e.g., a user manual, etc.) or through testing based on one or more quality assurance ("QA") procedures.

Information carried by EDID and DisplayID structures are known so they are not described in detail. A firmware object refers to a data structure that includes at least one of the following: information identifying the latest version of software that may be installed on display device 120; and information identifying one or more verified or tested versions of software that may be installed on display device 120. For example, a manufacturer of the MP device/system 120 may differ from a manufacturer of the display device. For this example, the manufacturer of MP device/system 120 may have tested and/or verified one or more versions of software that may be installed on display device 120 that enable a compatible relationship between the MP device/system 120 and the display device 120. Such information can be included in a firmware object.

A device capability object refers to a data structure that includes information about features of the display device 120 (e.g., resolutions that can be handled by the display device 120, etc.). This information can be obtained from an EDID structure or DisplayID structure.

A device port object refers to a data structure that includes information identifying the type, manufacturer, and capabilities of a port of the display device 120 that is coupled to the MP device/system 130. For example, the device port object for a port of display device 120 coupled to the MP device/system may have updated EDID or DisplayID structures that clarify some incorrect EDID or DisplayID structures provided by the manufacturer of the display device 120. The information in a device port object can discovered through testing based on one or more QA procedures.

A color management object refers to a data structure that includes at least one of the following: information identifying technical specifications of luminance (or nits) achievable by the display device 120; or information identifying technical specifications of brightness achievable by the display device 120; or information identifying technical specifications of bit depth and color space supported by the display device 120. For example, the device port object for a port of display device 120 coupled to the MP device/system may have updated EDID or DisplayID structures that clarify some incorrect EDID or DisplayID structures provided by the manufacturer of the display device 120.

A display configuration identifier (DCI) refers to a unique identifier (e.g., a unique hash, etc.) that is generated based on at least two of the following: a manufacturer of the device 120; a model number associated with the device 120; a version of software currently installed on the display device 120; some or all information in an EDID structure; or some or all information available in a DisplayID structure. In this way, there can be more than one DCI for the display device 120. For example, a first DCI is generated for the display device 120 having an earlier version of firmware installed and a second DCI is generated for the display device 120 having an latest version of firmware installed. Techniques of generating unique identifiers include, but are not limited to, hash function algorithms and other techniques of generating identifiers for indexing and retrieving items in a database. One way to distinguish two different DCIs associated with a single display device 120 is to use the Checksum byte in EDID or DisplayID structure. This checksum byte is unique for every DCI because it changes whenever any changes occur within the display device 120 data used to generate the DCI is modified.

The discovery logic/module 151A can determine that software installed on the display device 120 is obsolete and/or that one or more settings applied to the display device 120 have a sub-optimal configuration. For one embodiment, the discovery logic/module 151A performs this determination based on a comparison of the unique identifier generated from the extracted data in structure(s) 187 with another unique identifier (e.g., the DCI) generated from the information in the database 171. A match between checksum bytes of two identifiers can indicate the software installed on the device 120 is up-to-date and/or that the settings (e.g., display resolutions, etc.) for the device 120 are optimally configured. Consequently, a mismatch between checksum bytes of two identifiers can indicate the software installed on the device 120 is obsolete and/or the settings (e.g., display resolutions, etc.) for the device 120 are sub-optimally configured.

When the discovery logic/module 151A determines or detects obsolete software in the display device 120 and/or a sub-optimal configuration of settings applied to the display device 120, then the discovery logic/module 151A also determines whether an available update for the obsolete software in the display device 120 exists and/or whether a more optimal configuration for settings applied to the display device 120 is available. For one embodiment, the discovery logic/module 151A performs this determination based on a comparison of the unique identifier associated with structure(s) 187 and another unique identifier (e.g., the DCI, etc.) associated with database 171. For example, a mismatch between the two identifiers can indicate that the updates to the software in the device 120 have been released and/or that the display resolutions for the device 120 can be changed to more optimal configuration for digital content.

The discovery logic/module 151A can provide its determinations to a notification logic/module 151B. For one embodiment, the notification logic/module 151B can generate a notification based on its received input and cause the notification to be displayed on the display device 120. Alternatively or additionally, the notification logic/module 151B can provide the notification to other logic/module(s) implemented by the processing unit(s) 140 and/or 180. In this way, the notification can be used to trigger the functionalities associated with the other logic/module(s) implemented by the processing unit(s) 140 and/or 180. The notification can include information related to at least one of: obsolete software in the display device 120; a sub-optimal configuration for settings in the display device 120 (e.g., settings for display resolutions, settings for data transferred through one or more ports, etc.); an available update for software in the display device 120; or a more optimal configuration for settings in the display device 120.

Based on the determination that updated software has been released and/or that a more optimal configuration is available, the discovery logic/module 151A and/or the notification logic/module 151B can provide their outputs as input to an action logic/module 151C. The action logic/module 151C may perform an action or cause the other logic/module(s) implemented by the processing unit(s) 140 and/or 180 to perform the action. For one embodiment, the action logic/module 151C performs the action in response to determining that the software installed on the display device 120 is obsolete and that the updates to the obsolete software can be downloaded from a data store or external server (e.g., memory 160, etc.). For this embodiment, the action can include at least one of (i) cause an update for the obsolete software to be downloaded into the display device 120, the memory 160, and/or the action logic/module 151C; or (ii) cause the update to be installed in the display device 120. For another embodiment, the action is performed in response to determining that settings (e.g., the display mode) used by the display device 120 has a sub-optimal configuration and/or that a more optimal configuration is possible for the device 120. For this alternate embodiment, the action can include causing the setting(s) to change from the sub-optimal configuration to a more optimal configuration.

For one example, the display device 120 can have three display modes that support different display resolutions. For this example, the first display mode enables the device 120 to support a display resolution of 1,280 pixels×720 pixels at a 60 hertz (Hz) refresh rate; the second display mode enables support for a display resolution of 1,920 pixels×1,080 pixels at a 120 Hz refresh rate; and the third display mode enables support for a display resolution of 3,840 pixels×2,160 pixels at a 60 Hz refresh rate. For this example, if the MP device/system 130 delivers digital content having a display resolution of 3,840 pixels×2,160 pixels to the display device 120, but the display device 120 is not in third display mode, then the other two display modes would be sub-optimal for presenting the received digital content. Consequently, the display device 120 may not operate properly and the desired information from device 24 might not be properly displayed via display(s) 185. As described above, the MP logic/module 150 (e.g., logic/modules 151A-C, etc.) can detect the more optimal configuration that is the third display mode, notify a user and/or other logic/module(s) of the detected configuration, and/or cause a change from the sub-optimal configuration to the more optimal configuration.

For another example, the display device 120 can include an obsolete version of firmware. For this other example, if the MP device/system 130 delivers digital content having a display resolution of 3,840 pixels×2,160 pixels to the display device 120, but the installed firmware of the display device 120 prevents displaying the digital content, then the display device 120 may not operate properly and the desired information from device 24 might not be properly displayed via display(s) 185. The MP logic/module 150 described above can detect one or more available updates for the obsolete firmware (e.g., updates that enable viewing the digital content in this example, etc.), notify a user and/or other logic/module(s) of the detected update, cause the update to be downloaded, and/or cause the update to be installed on the display device 120.

One or more components of the system 100 may be implemented as one or more integrated circuits (ICs). For example, at least one of the MP device/system 130, the communication fabric 110, the display device 120, the optional peripheral(s) 190, or the memory 160 can be implemented as a system-on-a-chip (SoC) IC, a three-dimensional (3D) IC, any other known IC, or any known combination of ICs. For another embodiment, two or more of components of the system 100 are implemented together as one or more ICs. For example, at least two of the MP device/system 130, the communication fabric 110, the display device 120, the optional peripheral(s) 190, or the memory 160 are implemented together as a single SoC IC.

Figure 2:
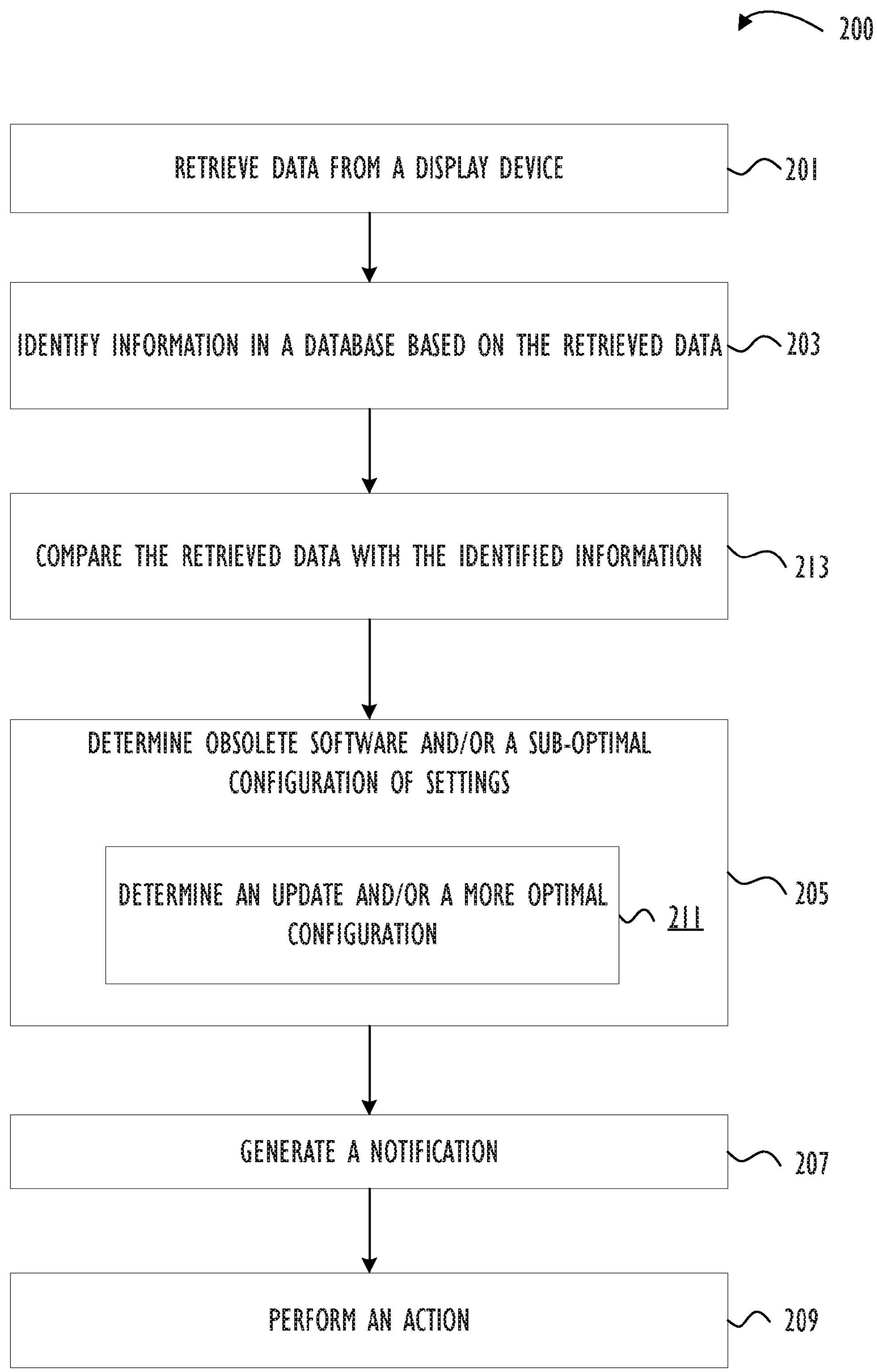
FIG. 2 is a flowchart representing an operation to manage a display device according to an embodiment.

FIG. 2 is a flowchart representing an operation 200 to manage a display device according to an embodiment. Operation 200 can be performed by an MP logic/module (e.g., the MP logic/module 150 described above in connection with FIGS. 1A and/or 1B). Operation 200 begins at block 201, where data is retrieved from a display device. A unique identifier can be generated based on data obtained from a display device. The data retrieved from a display device can include a data structure (e.g., structure(s) 187, etc.). Block 201 can be performed as described in connection with FIGS. 1A and/or 1B.

At block 203, the unique identifier is used to identify information in database characterizing the display device. This identification can include identifying a second unique identifier in the database (e.g., the DCI described above, etc.) that enables performance of blocks 213, 205, 211, 207, and 209, which are described below. Block 203 can be performed as described in connection with FIGS. 1A and/or 1B.

Block 213 includes comparing the first unique identifier associated with display device with information in a database that characterizes the display device. The comparison can be performed by generating or obtaining a second unique identifier (e.g., a DCI as described above, etc.) using information in the database, and performing the comparison of the two unique identifiers. Block 213 can be performed as described in connection with FIGS. 1A and/or 1B.

Operation 200 proceeds to block 205, where a determination is made that the display device includes obsolete software and/or a sub-optimal configuration of settings. This determination is based on the comparison performed in block 213. Block 205 can also include block 211. In this block, a determination is made about whether any solutions for the obsolete software and/or replacements for the sub-optimal configuration are available. For example, a determination can be made about whether an update has been released, or whether a more optimal configuration of settings can be used by the display device. Blocks 205 and 211 can be performed as described in connection with FIGS. 1A and/or 1B.

At block 207, a notification based on the determination performed in block 205 can be displayed by the display device. Furthermore, the notification can be provided to one or more processing units for additional processing. For one embodiment, the notification is generated in response to the determination performed in block 205. Block 207 can be performed as described in connection with FIGS. 1A and/or 1B. Process 200 ends at block 209, where an action is performed. The action can be performed in response to the determination and/or the notification. For example, the action can depend on whether an updated for obsolete software can be downloaded or whether a more optimal sub-configuration of setting is available. Block 209 can be performed as described in connection with FIGS. 1A and/or 1B.

Figure 3:
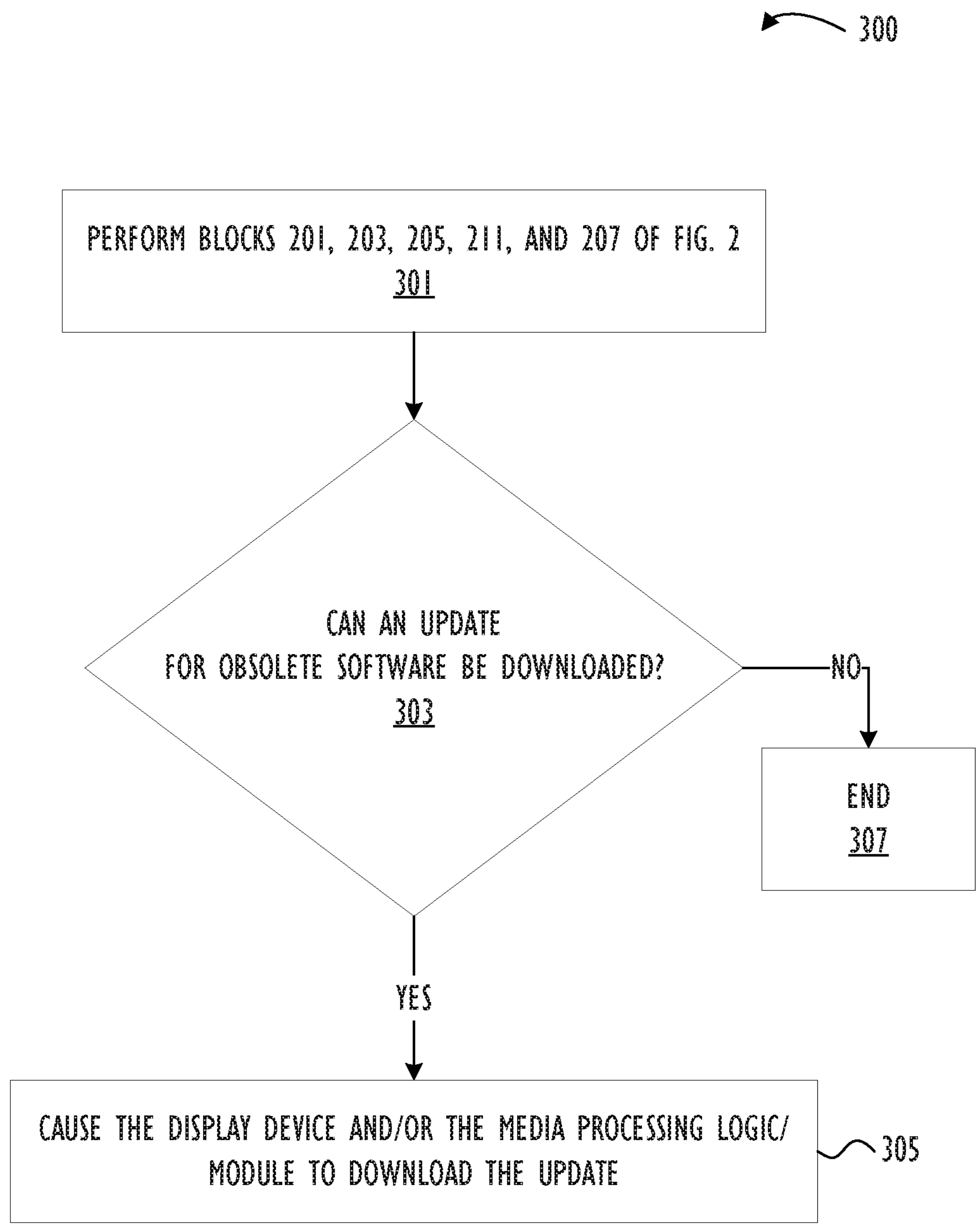
FIG. 3 is a flowchart representing an operation to perform one action to manage a display device according to one embodiment.

FIG. 3 is a flowchart representing an operation 300 to perform one action to manage a display device according to one embodiment. Operation 300 can be performed by an MP logic/module (e.g., the MP logic/module 150 described above in connection with FIG. 1A). Operation 300 is performed in response to determining that an update to obsolete software is available. That is, the update has been released and is available for retrieval from a storage (e.g., memory 160 described above in connection with FIGS. 1A and/or 1B). At block 301 of operation 300, an MP logic/module performs blocks 201, 203, 205, 211, and 207 (which are described above in connection with FIG. 2). Operation 300 proceeds to block 303, where a determination is made about whether the display device (e.g., device 120, etc.) or the MP logic/module (e.g., the MP logic/module 150, etc.) can download the update. When the update cannot be downloaded by the display device or the MP logic/module, operation 300 ends at block 307.

Operation 300 proceeds to block 305, when the MP logic/module performing operation 300 determines that the display device and/or the MP logic/module itself can download some or all of the update. For one embodiment, the MP logic/module performing operation 300 causes the display device to perform at least some of the download. Causing the display device to download at least some of the software can be performed in response to the MP logic/module detecting that the display device is capable of performing some or all of the download. For example, the MP logic/module transmits a data structure to the display device causing the display device to automatically download some or all of the software required to update obsolete software. The data structure can be transmitted via a coupling mechanism (e.g., mechanism 115, etc.). Such data structures may be based on one or more standards used by digital displays to communicate their capabilities to other devices. Examples of such standards include, but are not limited to, a universal serial bus Type C (USB-C) specification, a high-definition multimedia interface (HMDI) specification, or a DisplayPort® specification. These data structures can be based on EDID structures and/or DisplayID structures, as described above. Alternatively or additionally, the MP logic/module performing operation 300 can download at least some of the update. For one embodiment, the MP logic/module can perform at least some of the download in response to the MP logic/module detecting that it can perform some or all of the download. For a further embodiment, the MP logic/module can perform at least some of the download in response to the MP logic/module detecting that the display device cannot perform some or all the download. The display device may be incapable of performing some or all of the download because of a bandwidth associated with coupling mechanism (e.g., mechanism 115, etc.) and/or frame buffer requirements that exceed the display device's capabilities.

Each of the embodiments described above in the immediately preceding paragraph can be combined. For example, both the MP logic/module and the display device can download different portions of the update. This can assist with pooling the computational resources of the MP logic/module and the display device together, which in turn assists with reducing the resources expended by each of the MP logic/module and the display device to download the update.

The MP logic/module performing operation 300 can download some or all of the update by establishing an Internet Protocol (IP) network communications channel (also known as an IP tunnel) between two networks. For this embodiment, the IP tunnel is established to transport another network protocol by encapsulation of its packets. For example, a first network providing access to a memory (e.g., memory 160) where at least some of the update is stored can be different from a second network providing access to the display device requiring the update. For this example, an IP tunnel can be established by the MP logic/module performing operation 300 to download some or all of the update to the display device directly or to a memory coupled to the display device. For one embodiment of operation 300, some or all of the update is downloaded into memory coupled to the display device and/or the MP device. This memory can, for example, be the memory 160. For another embodiment, some or all of the update is downloaded into memory associated with or coupled to one or more processing unit(s) in the display device (e.g., processing unit(s) 180, etc.). For yet another embodiment, some or all of the update is downloaded into memory associated with or coupled to one or more processing unit(s) implementing the MP logic/module (e.g., processing unit(s) 140, memory, etc.).

Figure 4:
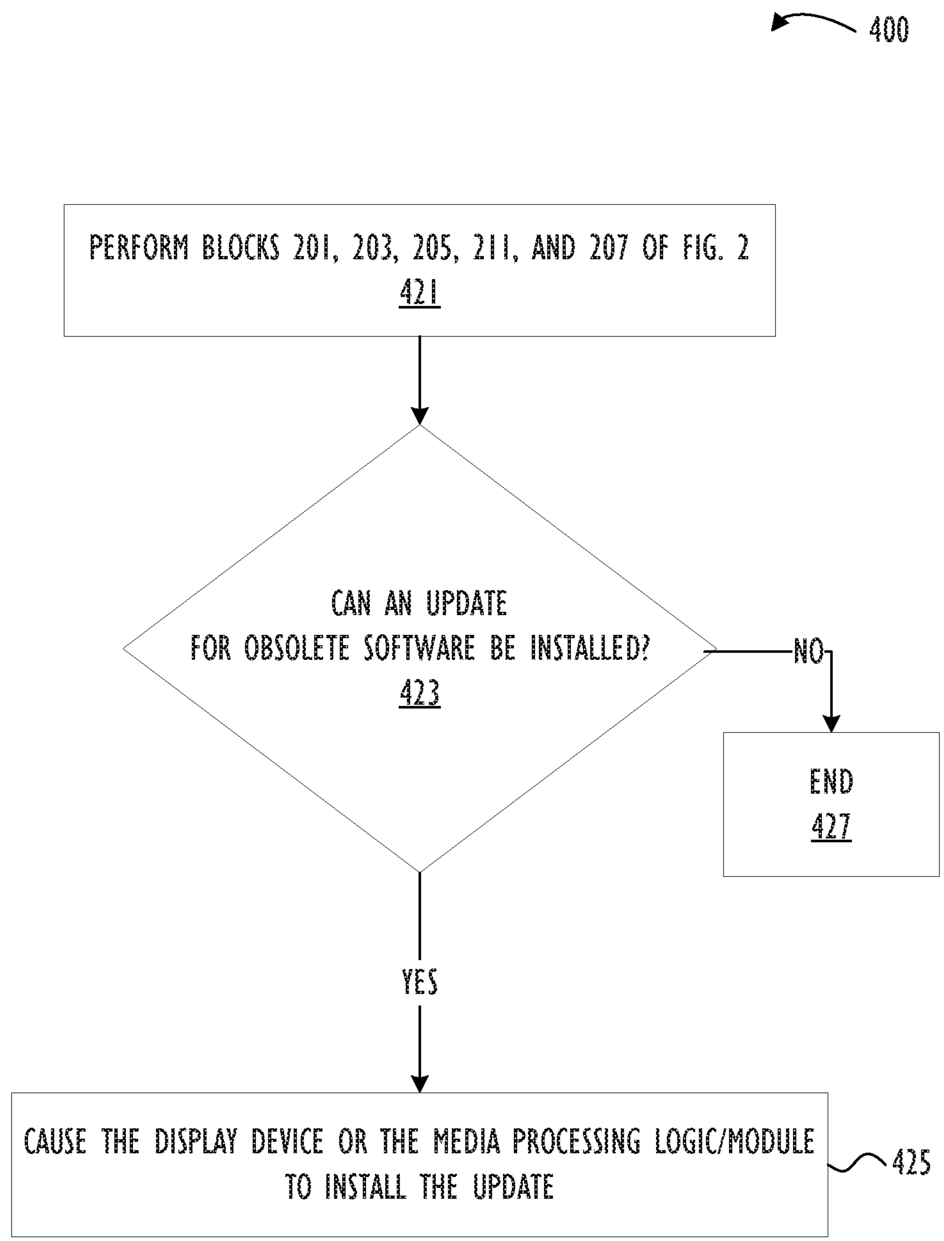
FIG. 4 is a flowchart representing an operation to perform another action to manage a display device according to one embodiment.

With regard now to FIG. 4, which is a flowchart representing an operation 400 to perform another action to manage a display device according to one embodiment. Operation 400 is performed in response to determining that an update to obsolete software has been retrieved from a storage (e.g., memory 160 described above in connection with FIGS. 1A and/or 1B). At block 421 of operation 400, an MP logic/module performs blocks 201, 203, 205, 211, and 207 (which are described above in connection with FIG. 2). Operation 400 proceeds to block 423, where a determination is made about whether the display device (e.g., device 120, etc.) or the MP logic/module (e.g., the MP logic/module 150, etc.) can install the some or all of update on the display device. When all of the installation cannot be performed by the display device or the MP logic/module, operation 400 ends at block 427.

Operation 400 proceeds to block 425 when the MP logic/module performing operation 400 determines that the display device itself and/or the MP logic/module can install some or all of the update on the display device. For one embodiment, the MP logic/module performing operation 400 causes the display device to install some or all of the update. Causing the display device to install some or all of the updates required to update obsolete software can be performed in response to the MP logic/module detecting that the display device is capable of performing some or all of the install. For example, the MP logic/module transmits a data structure to the display device causing the display device to automatically install some or all downloaded updates. The data structure can be transmitted via a coupling mechanism (e.g., mechanism 115, etc.). Such data structures may be based on one or more standards, as described above in connection with at least one of FIGS. 1A-3. Alternatively or additionally, the MP logic/module performing operation 400 can install some or all of the update on the display device. For one embodiment, the MP logic/module can perform some or all of the installation in response to the MP logic/module detecting that it can perform some or all of the installation. For a further embodiment, the MP logic/module can perform some or all of the installation in response to the MP logic/module detecting that the display device cannot perform some or all of the installation. The display device may be incapable of performing some or all of the install because of a bandwidth associated with coupling mechanism (e.g., mechanism 115, etc.) is exceeded and/or frame buffer requirements exceed the display device's capabilities. The MP logic/module performing operation 400 can install some or all of the update by gaining control over one or more processing unit(s) of the display device (e.g., unit(s) described above in connection with at least one of FIGS. 1A-3, etc.). For one embodiment, control over the display device is established via techniques of remote administration. Remote administration is possible because the information extracted from display device and/or the database can include data required for enabling the MP logic/module to connect to the display device and install some or all of the update.

Figure 5:
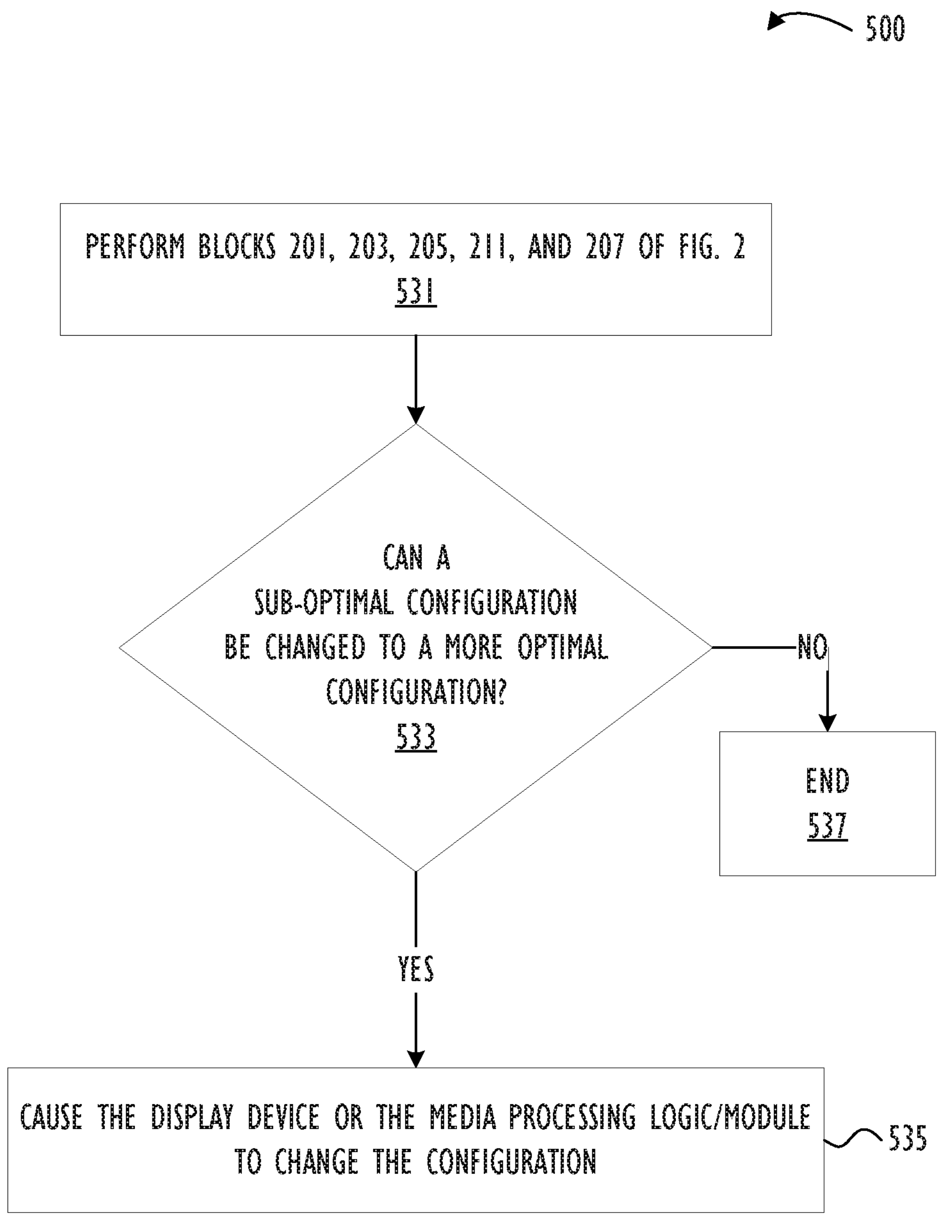
FIG. 5 is a flowchart representing an operation to perform yet another action to manage a display device according to one embodiment.

With regard now to FIG. 5, which is a flowchart representing an operation 500 to perform yet another action to manage a display device according to one embodiment. Operation 500 is performed in response to determining that setting(s) applied to the display device can be changed from a sub-optimal configuration to a more optimal configuration. An example of what constitutes a more optimal configuration is described above in connection with at least FIG. 1B. At block 531 of operation 500, an MP logic/module performs blocks 201, 203, 205, 211, and 207 (which are described above in connection with FIG. 2). Operation 500 proceeds to block 533, where a determination is made about whether the display device (e.g., device 120, etc.) or the MP logic/module (e.g., the MP logic/module 150, etc.) can change at least some of the setting to a more optimal configuration. When all the setting(s) cannot be changed by the display device or the MP logic/module, operation 500 ends at block 537. The setting(s) may be unchangeable because more optimal configurations are not possible. That is, the current settings are the most optimal configuration application in the given situation.

Operation 500 proceeds to block 535, when the MP logic/module performing operation 500 determines that the display device itself and/or the MP logic/module can change at least some of the settings used by the display device. For one embodiment, the MP logic/module performing operation 500 causes the display device to automatically change some or all of its settings. For example, the MP logic/module transmits a data structure to the display device that causes the display device to automatically change some or all of its own setting(s). The data structure can be transmitted via a coupling mechanism (e.g., mechanism 115, etc.) as described above in connection with one or more of FIGS. 1A-4. The MP logic/module performing operation 500 can change some or all of the settings by gaining control over one or more processing unit(s) of the display device. Such control can be established via techniques of remote administration, as described above in connection with FIG. 4.

Figure 6:
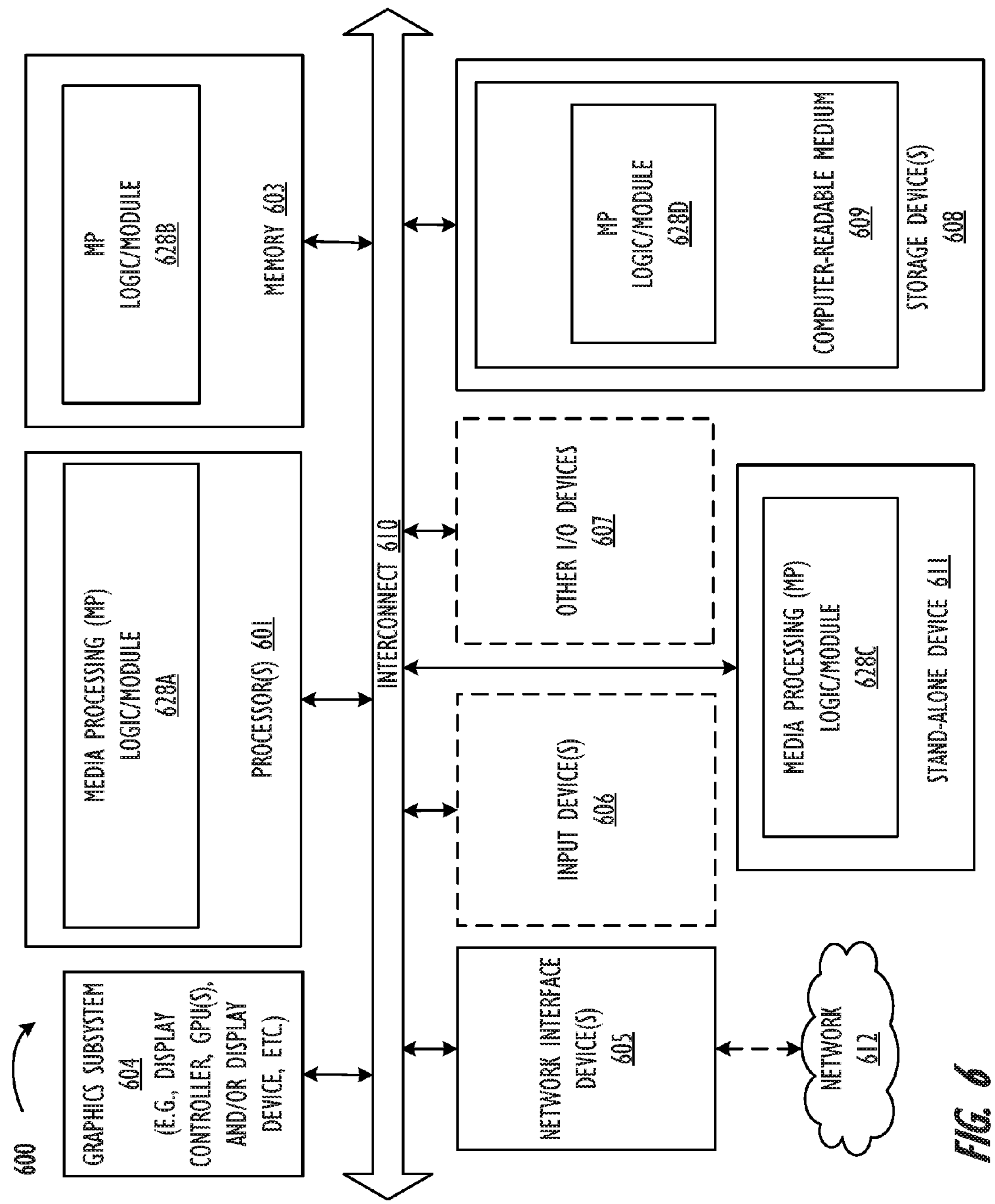
FIG. 6 illustrates an exemplary processing system according to one or more embodiments described herein.

FIG. 6 is a block diagram illustrating an example of a data processing system 600 that may be used with one embodiment. For example, the system 600 may represent any of the data processing systems described above performing any of the processes or methods described above in connection with one or more of FIGS. 1A-5.

System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high-level view of many components of the computer system. Nevertheless, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute at least one set of instructions to perform any of the methodologies discussed herein.

For one embodiment, system 600 includes processor(s) 601, memory 603, and devices 605-608 and 611 via a bus or an interconnect 610. Processor(s) 601 may represent a single processor or multiple processors with a single processor core or multiple processor cores included therein. Processor(s) 601 may represent one or more general-purpose processors such as a microprocessor, a central processing unit (CPU), graphics processing unit (GPU), or the like. More particularly, processor(s) 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor(s) 601 may also be one or more special-purpose processors such as an application specific integrated circuit (ASIC), an Application-specific instruction set processor (ASIP), a cellular or baseband processor, a field programmable gate array (FPGA), a digital signal processor (DSP), a physics processing unit (PPU), an image processor, an audio processor, a network processor, a graphics processor, a graphics processing unit (GPU), a network processor, a communications processor, a cryptographic processor, a co-processor, an embedded processor, a floating-point unit (FPU), or any other type of logic capable of processing instructions.

Processor(s) 601, which may be a low power multi-core processor socket such as an ultra-low voltage processor, may act as a main processing unit and central hub for communication with the various components of the system. Such processor(s) can be implemented as one or more system-on-chip (SoC) integrated circuits (ICs). A media processing (MP) logic/module 628A may reside, completely or at least partially, within processor(s) 601. For one embodiment, an MP logic/module 628A residing in the processor(s) 601 can enable the processor(s) 601 to perform any or all of the operations or methods described above in connection with one or more of FIGS. 1A-5. For example, the MP logic/module 628A manages the display device 604 by performing any, all, or some of the processes or methods described above in connection with one or more of FIGS. 1A-5.

System 600 may further include a graphics interface that communicates with optional graphics subsystem 604, which may include a display controller, a graphics processing unit (GPU), and/or a display device. Processor(s) 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor(s) 601 or any other device. For example, executable code and/or data from a variety of operating systems, device drivers, firmware (e.g., input output basic system or BIOS), and/or applications can be loaded in memory 603 and executed by processor(s) 601. An operating system can be any kind of operating system.

For one embodiment, the memory 603 includes an MP logic/module 628B. For one embodiment, when the instructions represented by the MP logic/module 628B are executed by the processor(s) 601, the instructions cause the processor(s) 601 to perform any, all, or some of the processes or methods described above in connection with one or more of FIGS. 1A-5. For example, the MP logic/module 628B enables management of the display device 604 by causing the processor(s) 601 to perform any, all, or some of the processes or methods described above in connection with one or more of FIGS. 1A-5.

System 600 may further include I/O devices such as devices 605-607, including network interface device(s) 605, optional input device(s) 606, and other optional I/O device(s) 607. Network interface device 605 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with display device 604), a pointer device such as a stylus, and/or a keyboard (e.g., physical keyboard or a virtual keyboard displayed as part of a touch sensitive screen). For example, input device 606 may include a touch screen controller coupled to a touch screen. The touch screen and touch screen controller can, for example, detect contact and movement or a break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

I/O devices 607 may include an audio device. An audio device may include a speaker and/or a microphone to facilitate voice-enabled functions, such as voice recognition, voice replication, digital recording, and/or telephony functions. Other I/O devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor(s) 601. For various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. In addition, a flash device may be coupled to processor(s) 601, e.g., via a serial optional peripheral interface (SPI). This flash device may provide for non-volatile storage of system software, including a basic input/output software (BIOS) and other firmware.

The system 600 may also include an MP logic/module 628C, which can be included in a specialized stand-alone computing device 611 that is formed from hardware, software, or a combination thereof. For one embodiment, the MP logic/module 628C performs any, all, or some of the processes or methods described above in connection with one or more of FIGS. 1A-5. For example, the MP logic/module 628C manages the display device 604 by performing any, all, or some of the processes or methods described above in connection with one or more of FIGS. 1A-5.

Storage device(s) 608 may include computer-accessible storage medium 609 (also known as a machine-readable storage medium or a computer-readable medium) on which is stored one or more sets of instructions or software—e.g., MP logic/module 628D. For one embodiment, the instruction(s) or software stored on storage medium 609 embody one or more of the methodologies or functions described above in connection with one or more of FIGS. 1A-5. For one embodiment, the storage device 608 includes the MP logic/module 628D as executable instructions. When the instructions represented by MP logic/module 628D are executed by the processor(s) 601, the instructions cause the processor(s) 601 to perform any, all, or some of the processes or methods described above in connection with one or more of FIGS. 1A-5. For example, the MP logic/module 628D enables management of the display device 604 by causing the processor(s) 601 to perform any, all, or some of the processes or methods described above in connection with one or more of FIGS. 1A-5. One or more of logic/modules 628A, 628B, 628C, and 628D may be transmitted or received over a network 612 via network interface device 605.

Computer-readable storage medium 609 can store some or all of the software functionalities of MP logic/module 628D described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Note that while system 600 is illustrated with various components of a data processing system, it is not intended to represent any particular architecture or manner of interconnecting the components; as such, details are not germane to the embodiments described herein. It will also be appreciated that network computers, handheld computers, mobile phones, servers, and/or other data processing systems, which have fewer components or perhaps more components, may also be used with the embodiments described herein.

Description of at least one of the embodiments set forth herein is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known processes and manufacturing techniques have not been described in particular detail in order to not unnecessarily obscure the embodiments. Reference throughout this specification to "one embodiment," "an embodiment," "another embodiment," "other embodiments," "some embodiments," and their variations means that a particular feature, structure, configuration, or characteristic described in connection with the embodiment is included in at least one embodiment. Thus, the appearances of the phrase "for one embodiment," "for an embodiment," "for another embodiment," "in other embodiments," "in some embodiments," or their variations in various places throughout this specification are not necessarily referring to the same embodiment. Furthermore, the particular features, structures, configurations, or characteristics may be combined in any suitable manner in one or more embodiments.

In the following description and claims, the terms "coupled" and "connected," along with their derivatives, may be used. It should be understood that these terms are not intended as synonyms for each other. "Coupled" is used to indicate that two or more elements or components, which may or may not be in direct physical or electrical contact with each other, co-operate or interact with each other. "Connected" is used to indicate the establishment of communication between two or more elements or components that are coupled with each other.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein can relate to an apparatus for performing a computer program (e.g., the operations described herein, etc.). Such a computer program is stored in a non-transitory computer readable medium. A machine-readable medium includes any mechanism for storing information in a form readable by a machine (e.g., a computer).

For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

Although the processes or methods are described above in terms of some sequential operations, it should be appreciated that some of the operations described may be performed in a different order. Moreover, some operations may be performed in parallel rather than sequentially. Embodiments described herein are not described with reference to any particular programming language. It will be appreciated that a variety of programming languages may be used to implement the teachings of embodiments of the invention as described herein. In utilizing the various aspects of the embodiments described herein, it would become apparent to one skilled in the art that combinations, modifications, or variations of the above embodiments are possible for managing components of processing system to increase the power and performance of at least one of those components. Thus, it will be evident that various modifications may be made thereto without departing from the broader spirit and scope of at least one of the inventive concepts set forth in the following claims. The specification and drawings are, accordingly, to be regarded in an illustrative sense rather than a restrictive sense.

In the development of any actual implementation of one or more of the inventive concepts set forth in the embodiments described herein (e.g., as a software and/or hardware development project, etc.), numerous decisions must be made to achieve the developers' specific goals (e.g., compliance with system-related constraints and/or business-related constraints). These goals may vary from one implementation to another, and this variation could affect the actual implementation of one or more of the inventive concepts set forth in the embodiments described herein. Also, development efforts might be complex and time-consuming, but may still be a routine undertaking for a person having ordinary skill in the art in the design and/or implementation of one or more of the inventive concepts set forth in the embodiments described herein.

As used herein, the phrase "at least one of A, B, or C" includes A alone, B alone, C alone, a combination of A and B, a combination of B and C, a combination of A and C, and a combination of A, B, and C. That is, the phrase "at least one of A, B, or C" means A, B, C, or any combination thereof such that one or more of a group of elements consisting of A, B, and C, and should not be interpreted as requiring at least one of each of the listed elements A, B, and C, regardless of whether A, B, and C are related as categories or otherwise. Furthermore, the use of the article "a" or "the" in introducing an element should not be interpreted as being exclusive of a plurality of elements. Also, the recitation of "A, B, and/or C" is equal to "at least one of A, B, or C." Additionally, the recitation of "one or more of A, B, and C" is equal to "at least one of A, B or C." Moreover, the recitation of "A, B, or C" is equal to "at least one of A, B, or C."

What is claimed is:

1. A computer-implemented method for managing a display device, comprising:

retrieving, by one or more processing devices, data from a display device, wherein the data includes standardized display identification data indicating a capability of the display device;

identifying information in a database based on the retrieved data, the information characterizing the display device;

comparing a first identifier associated with the retrieved data with a second identifier associated with the identified information;

determining, in response to a mismatch between the first and second identifiers, that software installed on the display device is obsolete, or that one or more settings of the display device have a sub-optimal configuration for displaying a predetermined type of digital content on the display device;

generating a notification based on the determination, the notification being displayed on the display device; and performing, by the one or more processing devices, an action based on the determination, wherein, in response to the software installed on the display device being obsolete, the action includes initiating a software update on the display device, and wherein, in response to the one or more settings of the display device having the sub-optimal configuration, the action includes initiating a change of the one or more settings from the sub-optimal configuration to an optimal configuration that is optimized for displaying the predetermined type of digital content on the display device.

2. The computer-implemented method of claim 1, wherein, in response to the software installed on the display device being obsolete, the action further includes initiating one or more of:

a download of the software update to memory; and an installation of the software update on the display device when the software update is available.

3. The computer-implemented method of claim 2, wherein the retrieved data further includes one or more of a manufacturer of the display device, a model number of the display device, a version of the software installed on the display device, extended display identification data (EDID) associated with the display device, display identification data (DisplayID) associated with the display device, and information associated with a port of the display device coupled to the one or more processing devices, and wherein the standardized display identification data is at least one of the EDID and the DisplayID.

4. The computer-implemented method of claim 2, wherein the information characterizing the display device includes one or more of information about one or more versions of the software installed on the display device, information about a capability of the one or more versions of the software installed on the display device, a manufacturer of the display device, a model identifier of the display device, EDID associated with the display device, DisplayID associated with the display device, and information about one or more capabilities of a port of the display device.

5. The computer-implemented method of claim 2, wherein the notification includes information related to one or more of:

the software of the display device is obsolete;

the software update is available; and the optimal configuration is available.

6. The computer-implemented method of claim 2, wherein the memory is coupled to one or more of the display device and the one or more processing devices and wherein initiating the download of the software update includes one or more of:

causing, by the one or more processing devices, the display device to perform at least some of the download in response to the one or more processing devices detecting that the display device is capable of performing the download; and performing, by the one or more processing devices, at least some of the download in response to the one or more processing devices detecting that the one or more processing devices are capable of performing the download.

7. The computer-implemented method of claim 2, wherein initiating the installation of the software update when the software update is available includes one or more of:

causing, by the one or more processing devices, the display device to perform at least some of the installation in response to the one or more processing devices detecting that the display device is capable of performing the installation; and performing, by the one or more processing devices, at least some of the installation in response to the one or more processing devices detecting that the one or more processing devices are capable of performing the installation.

8. The computer-implemented method of claim 1, wherein initiating the change of the one or more settings from the sub-optimal configuration to the optimal configuration comprises:

causing, by the one or more processing devices, the display device to perform at least some of the change in response to the one or more processing devices detecting that the display device is capable of performing the change; and performing, by the one or more processing devices, at least some of the change in response to the one or more processing devices detecting that the one or more processing devices are capable of performing the change.

9. A non-transitory computer readable medium having stored thereon a program for managing a display device, the program comprising instructions that when executed by one or more processing devices, cause the one or more processing devices to:

retrieve data from a display device, the data including standardized display identification data indicating a capability of the display device;

identify information in a database based on the retrieved data, the information characterizing the display device;

compare a first identifier associated with the retrieved data with a second identifier associated with the identified information;

determine, in response to a mismatch between the first and second identifiers, that software installed on the display device is obsolete, or that one or more settings of the display device have a sub-optimal configuration for displaying a predetermined type of digital content on the display device;

generate a notification based on the determination, the notification being displayed on the display device; and perform an action based on the determination, wherein, in response to the software installed on the display device being obsolete, the action includes initiating a software update on the display device, and wherein, in response to the one or more settings of the display device having the sub-optimal configuration, the action includes initiating a change of the one or more settings from the sub-optimal configuration to an optimal configuration that is optimized for displaying the predetermined type of digital content on the display device.

10. The non-transitory computer readable medium of claim 9, wherein, in response to the software installed on the display device being obsolete, the instructions for causing the one or more processing devices to perform the action further comprise instructions for causing the one or more processing devices to initiate one or more of:

a download of the software update to memory; and an installation of the software update on the display device when the software update is available.

11. The non-transitory computer readable medium of claim 10, wherein the memory is coupled to one or more of the display device and the one or more processing devices and wherein the instructions for causing the one or more processing devices to initiate the download of the software update further comprise instructions for causing the one or more processing devices to:

cause the display device to perform at least some of the download in response to the one or more processing devices detecting that the display device is capable of performing the download; or perform at least some of the download in response to the one or more processing devices detecting that the one or more processing devices are capable of performing the download.

12. The non-transitory computer readable medium of claim 10, wherein the instructions for causing the one or more processing devices to initiate the installation of the software update when the software update is available further comprise instructions for causing the one or more processing devices to:

cause the display device to perform at least some of the installation in response to the one or more processing devices detecting that the display device is capable of performing the installation; or perform at least some of the installation in response to the one or more processing devices detecting that the one or more processing devices are capable of performing the installation.

13. The non-transitory computer readable medium of claim 9, wherein the retrieved data further includes one or more of a manufacturer of the display device, a model number of the display device, a version of the software installed on the display device, extended display identification data (EDID) associated with the display device, display identification data (DisplayID) associated with the display device, and information associated with a port of the display device coupled to the one or more processing devices, and wherein the standardized display identification data is at least one of the EDID and the DisplayID.

14. The non-transitory computer readable medium of claim 9, wherein the information characterizing the display device includes one or more of information about one or more versions of the software installed on the display device, information about a capability of the one or more versions of the software installed on the display device, a manufacturer of the display device, a model identifier of the display device, EDID associated with the display device, DisplayID associated with the display device, and information about one or more capabilities of a port of the display device coupled to the one or more processing devices.

15. The non-transitory computer readable medium of claim 9, wherein the notification includes information related to one or more of:

the software of the display device is obsolete;

the software update is available; and the optimal configuration is available.

16. The non-transitory computer readable medium of claim 9, wherein the instructions for causing the one or more processing devices to initiate the change of the one or more settings from the sub-optimal configuration to the optimal configuration comprise instructions for causing the one or more processing devices to:

cause the display device to perform at least some of the change in response to the one or more processing devices detecting that the display device is capable of performing the change; or perform at least some of the change in response to the one or more processing devices detecting that the one or more processing devices are capable of performing the change.

17. A system for managing a digital device, the system comprising:

memory storing data, the data including instructions;

a display device; and one or more processing devices coupled to the memory and the display device, wherein the one or more processing devices are configured to execute the instructions to:

retrieve, by a discovery module implemented by the one or more processing devices, data from the display device, the retrieved data including standardized display identification data indicating a capability of the display device;

identify information in a database based on the retrieved data, the information characterizing the display device;

compare a first identifier associated with the retrieved data with a second identifier associated with the identified information;

determine, in response to a mismatch between the first and second identifiers, that software installed on the display device is obsolete, or that one or more settings of the display device have a sub-optimal configuration for displaying a predetermined type of digital content on the display device;

generate a notification based on the determination, the notification being generated by a notification module implemented by the one or more processing devices and the notification module causing the notification to be displayed on the display device; and perform, by an action module implemented by the one or more processing devices, an action based on the determination, wherein, in response to the software installed on the display device being obsolete, the action includes initiating a software update on the display device, and wherein, in response to the one or more settings of the display device having the sub-optimal configuration, the action includes initiating a change of the one or more settings from the sub-optimal configuration to an optimal configuration that is optimized for displaying the predetermined type of digital content on the display device.

18. The system of claim 17, wherein, in response to the software installed on the display device being obsolete, the instructions for causing the one or more processing devices to perform the action further comprise instructions for causing the one or more processing devices to initiate one or more of:

a download of the software update to memory; and an installation of the software update on the display device when the software update is available.

19. The system of claim 18, wherein the retrieved data further includes one or more of a manufacturer of the display device, a model number of the display device, a version of the software installed on the display device, extended display identification data (EDID) associated with the display device, display identification data (DisplayID) associated with the display device, and information associated with a port of the display device coupled to the one or more processing devices, and wherein the standardized display identification data is at least one of the EDID and the DisplayID.

20. The system of claim 18, wherein the information characterizing the display device includes one or more of information about one or more versions of the software installed on the display device, information about a capability of the one or more versions of the software installed on the display device, a manufacturer of the display device, a model identifier of the display device, EDID associated with the display device, DisplayID associated with the display device, information about one or more capabilities of a port of the display device coupled to the one or more processing devices.

21. The system of claim 18, wherein the notification includes information related to one or more of:

the software of the display device is obsolete;

the software update is available; and the optimal configuration is available.

22. The system of claim 18, wherein the instructions for causing the one or more processing devices to initiate the download of the software update comprise instructions for causing the one or more processing devices to:

cause, by the action module, the display device to perform at least some of the download in response to the action module detecting that the display device is capable of performing the download, wherein the memory is coupled to at least one of the display device or the one or more processing devices; or perform, by the action module, at least some of the download in response to the action module detecting that the one or more processing devices are capable of performing the download.

23. The system of claim 18, wherein the instructions for causing the one or more processing devices to initiate the installation of the software update when the software update is available comprise instructions for causing the one or more processing devices to:

cause, by the action module, the display device to perform at least some of the installation in response to the action module detecting that the display device is capable of performing the installation; or perform, by the action module, at least some of the installation in response to the action module detecting that the one or more processing devices are capable of performing the installation.

24. The system of claim 17, wherein the instructions for causing the one or more processing devices to initiate the change of the one or more settings from the sub-optimal configuration to the optimal configuration comprise instructions for causing the one or more processing devices to:

cause, by the action module, the display device to perform at least some of the change in response to the action module detecting that the display device is capable of performing the change; or perform, by the action module, at least some of the change in response to the action module detecting that the one or more processing devices are capable of performing the change.

* * * * *